UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

OMEGA-HALOGEN-METHYL-ANTHRAQUINONE COMPOUND.

No. 893,507.      Specification of Letters Patent.      Patented July 14, 1908.

Application filed February 16, 1906. Serial No. 301,451.

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Omega-Halogen-Methyl-Anthraquinone Compounds, of which the following is a specification.

My invention relates to the production of a new class of chemical compounds.

I have discovered that by treating 2-methyl-anthraquinone, or a derivative thereof, with halogen, or with a substance which evolves halogen, I can obtain derivatives which contain halogen in the side chain, that is omega-halogen derivatives, and, according to the quantity of halogen employed, the substitution can be made to take place to a greater, or lesser, extent.

My new halogen derivatives are characterized by being crystalline compounds which are soluble in glacial acetic acid. They possess a white to yellow color and are very useful for the preparation of coloring matters.

The compound which I wish to be understood as claiming specifically is omega-dichlor-2-methyl-anthraquinone which can be obtained in the form of white crystals melting at a temperature of about two hundred degrees centigrade (200° C.) and which possesses a composition corresponding to the formula

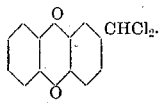

The following examples will serve to further illustrate the nature of my invention and how it may be carried into practical effect, but my invention is not confined to these examples. The parts are by weight.

Example 1. Heat together, in an autoclave, for six (6) hours, at a temperature of one hundred and seventy (170) degrees centigrade, ten (10) parts of 2-methyl-anthraquinone and eight (8) parts of bromin, and treat the reaction product first with water and then extract it with alcohol in order to remove small quantities of impurities, and finally, if necessary, re-crystallize from glacial acetic acid. The compound produced melts at a temperature of about from two hundred (200) to two hundred and two (202) degrees centigrade, and analysis points to its being a monobrom derivative. The reaction can be carried out at a considerably lower temperature, in which case, however, the time required to complete the reaction is much greater. If, in this example, double the quantity of bromin be employed, and the reaction product be worked up in a similar manner, the dibrom derivative is obtained.

Example 2. In order to obtain a chlorin derivative of 2-methyl-anthraquinone, treat this latter with chlorin at a temperature of from one hundred and fifty (150) to one hundred and sixty (160) degrees centigrade. The mass melts after a short time. Continue passing in chlorin until the weight increases from about twenty (20) to twenty-five (25) per cent. In order to work up the reaction product, which consists of a mixture of the monochlor and dichlor derivatives, powder and wash with water, and then treat with alcohol in which the monochlor derivative is easily soluble and from which it can be re-crystallized. The part which is difficultly soluble in alcohol can be re-crystallized from glacial acetic acid and in this manner the dichlor derivative of 2-methly-anthraquinone, melting at a temperature of two hundred (200) degrees centigrade, is obtained in the form of beautiful crystals.

Example 3. Heat together, in an autoclave, for six (6) hours, at a temperature of one hundred and seventy (170) degrees centigrade, ten (10) parts of 2-methyl-anthraquinone and twelve (12) parts of sulfur oxychlorid. Extract the reaction product by means of alcohol and crystallize the residue from glacial acetic acid. The product so obtained is identical with the dichlor derivative of the foregoing Example 2. If, in this example, half the quantity of sulfur oxychlorid be employed the monochlor derivative described in Example 2 is obtained.

Example 4. Heat together, for six (6) hours, at a temperature of from one hundred and sixty (160) to one hundred and seventy (170) degrees centigrade, ten (10) parts of 1-chlor-2-methyl-anthraquinone and seven (7) parts of bromin. Extract the reaction product by means of alcohol and crystallize the residue from glacial acetic acid. 1-brom-2-methyl-anthraquinone reacts in the same way if ten (10) parts thereof be heated with five and three-fifths (5.6) parts of bromin.

Example 5. Heat together, for six (6) hours, in an autoclave, at a temperature of from one hundred and sixty (160) degrees centigrade, to one hundred and seventy (170) degrees centigrade, ten (10) parts of 1-chlor-2-methyl-anthraquinone and fourteen (14) parts of bromin and work up the reaction product as described in the foregoing Example 4.

Example 6. Heat together, for from four (4) to six (6) hours at a temperature of from one hundred and fifty (150) to one hundred and seventy (170) degrees centigrade, ten (10) parts of 4-brom-1-hydroxy-2-methyl-anthraquinone and five (5) parts of bromin and crystallize the reaction product from glacial acetic acid, whereupon the new bromin derivative is obtained in the form of golden glittering needles. If, in this example, double the quantity of bromin be employed, the corresponding omega-dibrom derivative of brom-hydroxy-methyl-anthraquinone is obtained.

Example 7. If the quantity of halogen in the foregoing example be increased and if, for instance, ten (10) parts of methyl-anthraquinone be treated with twenty-four (24) parts of bromin the tribrom derivative of methyl-anthraquinone can be obtained. The reaction proceeds better if a halogen carrier such for instance as iodin be present during the reaction. This differs from the mono- and di-halogen derivatives in being very much more difficultly soluble in nearly all solvents.

Now what I claim is:

1. The process for the production of omega halogen derivatives of a 2-methyl-anthraquinone body by acting on a 2-methyl-anthraquinone body with a halogenizing substance.

2. The process for the production of omega halogen derivatives of 2-methyl-anthraquinone by acting on 2-methyl-anthraquinone with a halogenizing substance.

3. The process for the production of omega-dichlor-2-methyl-anthraquinone by acting on 2-methyl-anthraquinone with chlorin.

4. As new articles of manufacture the omega halogen derivatives of a 2-methyl-anthraquinone body which can be obtained by acting on a 2-methyl-anthraquinone body with a halogenizing substance and which are soluble in glacial acetic acid and possess a white to yellow color.

5. As a new article of manufacture omega-dichlor-2-methyl-anthraquinone which can be obtained by acting on 2-methyl-anthraquinone with chlorin and which is a crystalline compound and is soluble in glacial acetic acid, possesses a white color and melts at a temperature of about two hundred degrees centigrade and which possesses a composition corresponding to the formula

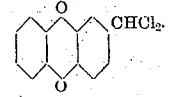

In testimony whereof I have hereunto set my hand in the presence of two subscribing witnesses.

MAX HENRY ISLER.

Witnesses:
J. ALEC. LLOYD,
JOS. H. LEUTE.